United States Patent [19]

Kasahara

[11] Patent Number: 4,616,355
[45] Date of Patent: Oct. 7, 1986

[54] OPTICAL HEAD DEVICE

[75] Inventor: Akihiro Kasahara, Tokyo, Japan

[73] Assignee: Kabushiki Kaisha Toshiba, Kawasaki, Japan

[21] Appl. No.: 645,104

[22] Filed: Aug. 28, 1984

[30] Foreign Application Priority Data

Sep. 26, 1983 [JP] Japan .................. 58-177375

[51] Int. Cl.⁴ ............................................. G11B 7/08
[52] U.S. Cl. ............................................... 369/45
[58] Field of Search ............... 250/201 DF; 369/44, 369/45, 46, 121, 122

[56] References Cited

U.S. PATENT DOCUMENTS 4,385,373  5/1983  Howe .
4,408,313  10/1983  Musha .
4,449,213  5/1984  Noborimoto et al. ............... 369/45

FOREIGN PATENT DOCUMENTS 371276   3/1978  Austria .
0053476  11/1981  European Pat. Off. .
0058018  1/1982   European Pat. Off. .
56-117337  2/1980  Japan .
56-130840  3/1980  Japan .
58-182138  10/1983  Japan ................... 369/45
58-182139  10/1983  Japan ................... 369/45
58-182140  10/1983  Japan ................... 369/45

Primary Examiner—Donald McElheny, Jr.
Attorney, Agent, or Firm—Oblon, Fisher, Spivak, McClelland & Maier

[57] ABSTRACT

A support mechanism supports a lens movable in focusing and tracking directions. Located on both sides of holder portions for holding the lens are structures each of which comprises two adjacent parallelograms whose one sides are common to each other. A connector portion comprising a stiff plate is arranged at each side of the structure (except that side of the structure which is directed to the holder portions). The point of intersection between the sides of the structure forms a hinge portion and two adjacent connector portions can be swung around the hinge portion. The structure deforms to move the lens in the focusing and tracking directions. A coil unit is arranged at the holder portion. This coil unit has focusing and tracking coils, which are subject to magnetic field applied from a magnet. When current is applied to the coils, the coil or coil unit receives force in the focusing and tracking directions. The movement of the lens can be controlled in the focusing and tracking directions by adjusting the magnitude and direction of the current applied.

10 Claims, 23 Drawing Figures

OPTICAL HEAD DEVICE

BACKGROUND OF THE INVENTION

The present invention relates to an optical head device for reproducing signals recorded on an optical recording medium and, more particularly, it relates to an optical head device capable of controlling focusing and tracking processes with high accuracy.

Various kinds of digital audio machines have been developed these days. Since excellently reproduced signals can be obtained independently of the properties of the recording medium, particularly with the device in which an audio signal is digitally recorded and reproduced using the PCM technology, it has been practically used as the disk recording device of the optical type, for example. With this disk record device of the optical type, for example, an optical disk having a diameter of 12 cm and a thickness of 1.2 mm and coated by a thin metal film is used, and pits which correspond to the digital information of audio signal are recorded on the thin metal film. These pits are recorded at a certain linear velocity, driving the disk at a variable rotation speed of 200 to 500 rpm. In a case where the pitch of the disk is 1.6 μm, stereo signals can be recorded on a face of the disk for about one hour.

When recorded signals are reproduced from the disk with this optical type head device, it is necessary that the tracking of the optical head and the focusing of the reproducing optical system are controlled with high accuracy. Further, it is necessary that parts of the head have a simple construction and are associated with one another to achieve a reliable operation. Furthermore, it is necessary from practical viewpoint that the head device is small in size and the current consumption of the device is low.

The conventional optical head device is shown in FIG. 1. A fixing member 10 is fixed to a body of the optical head device. One end of each of the four horizontal plate springs 14 is attached to the fixing member 10. A movable member 12 is fixed to the other ends of the plate springs 14. One end of each of the four plate springs 18 with its face remaining vertical is fixed to the movable member 12. A holder 16 to which an objective lens 20 is attached is fixed to the other ends of the plate springs 18. The holder 16 and the objective lens 20 are therefore supported by the plate springs 14 and 18 through the movable member 12. The holder 16 and the lens 20 can move two-dimensionally in the focusing and tracking direction 2 and 4 thanks to the elastic deformation of the plate springs 14 and 18.

With the optical head device of this type, it is necessary that focusing and tracking control be achieved with stability even when any impact is applied from outside the device. It is necessary for this reason that the servo band be higher than 2 KHz. It is therefore necessary that the operational characteristic (or suspension characteristic), which is determined by the elasticity of the plate springs and the weight of the movable member, holder and the like, has a secondary natural frequency, if any, higher than 8KHz in the tracking and focusing directions. In addition, the DC gain must be high to stabilize the servo system. It is necessary for this reason that the suspension characteristic has a primary natural frequency which ranges from 0 to 40 Hz.

In the case of the optical head device embodied according to the conventional technology, however, it is extremely difficult to make the secondary natural frequency higher than 8 KHz when the primary natural frequency is about 40 Hz because the weight of the movable member 12 is large. The servo band is narrow accordingly. When the holder 16 is moved in the focusing and tracking directions 2 and 4, the plate springs 14 and 18 deform elastically to shift the holder 16 in the signal reading direction (perpendicular to the directions 2 and 4), thereby causing the jitter (jiggle). In order to reduce this jitter, it is necessary that the plate springs 14 and 18 be made long. This makes the device large in size.

Another conventional optical disk device is shown in FIGS. 2 and 3. A cylindrical fixing member 22 is fixed to a body of the device. Outer ends of paired focusing diaphragm springs 28 separated vertically from each other are fixed to the inner circumferential face of this fixing member 22. A cylindrical movable member 24 is fixed to the inner ends of the springs 28. Trunk members 32 are fixed to the lower end of the movable member 24. A pair of tracking plate springs 30 parallel to each other are erected on the trunk members 32. A holder 26 for supporting a lens 20 is held between the upper ends of the plate springs 30. The holder 26 can move in the focusing direction 2 thanks to the elastic deformation of the diaphragm springs 28 and in the tracking direction 4 thanks to the elastic deformation of the plate springs 30.

When the tracking plate springs 30 are shifted in the tracking direction 4, their stiffness in the focusing direction 2 decreases remarkably in the case of the device having the above-described arrangement. Therefore, the secondary natural frequency in the focusing process by means of the plate springs 30 decreases remarkably, and the secondary natural frequency becomes lower than 8 KHz, similar to the case shown in FIG. 1. The servo band is narrow accordingly and it is difficult to stably operate the device.

A further optical head device is shown in FIGS. 4 and 5. A lens 20 is supported by a holder 44, which is also supported at the both sides thereof by means of a pair of support mechanisms. The support mechanism has a fixing member 34 fixed to the device body, and a movable member 38 for fixedly supporting the holder 44. The fixing member 34 and movable member 38 are vertically separated from each other and connected to a trunk member 36 by means of plate springs 40 whose faces are kept parallel to each other. FIGS. 6 through 8 are side views only showing the support mechanism in order to explain the operation of the device shown in FIGS. 4 and 5. When the plate springs 40 bend as shown in FIG. 7 from their neutral state (in FIG. 6), the movable member 38 and the holder 44 can be moved in the focusing direction 2. On the other hand, when the plate springs 40 bend as shown in FIG. 8, the movable member 38 and the holder 44 can be moved in the tracking direction 4.

In the case of this device, the movable member 38 can be held and moved in the focusing and tracking directions 2 and 4. It is easy for this device to obtain a wide servo band. In order to use the plate springs 40 within the limit of their elasticity, however, it is necessary that they be made long. This makes the device large in size. In addition, when the trunk member 36 is shifted from its neutral state (FIG. 6), the stiffness of the support mechanism decreases in a direction in which the movable member 38 falls, thereby causing resonance of this falling mode. This secondary resonance makes the servo system unstable for controlling the movement of the movable member 38.

SUMMARY OF THE INVENTION

The object of the present invention is to provide an optical head device which is small-sized, highly usable, having a wide servo band, and capable of operating with stability.

According to the present invention, there is provided an optical head device whose lens can be moved in the focusing and tracking directions. This optical head device has a casing, a support mechanism for supporting the lens movable in the focusing direction and also in the tracking direction perpendicular to the focusing direction, and a driving means for moving the lens supported by the support mechanism to the focusing and tracking directions.

The support mechanism has connector portions for forming a pair of structures comprising two parallelograms whose one sides are common to each other, holder portions arranged between the structures to hold the lens, and hinge portions for connecting the two connector portions or connector and holder portions to swing around the hinge portion, wherein the structures deform, holding their parallelograms, to move the lens in the focusing and tracking directions.

According to the present invention, the lens is supported not by the plate springs as in the conventional cases but by combinations between the connector portions and the hinge portions. Therefore, the optical head device according to the present invention can be smaller in size than those in the conventional cases. In addition, the connector portions can be easily shortened to thereby make the device still further reduced in size. The connector portions do not deform substantially, but the hinge portions deform to deform the structures, so that the secondary natural frequency can be easily made higher than 10 KHz to thereby widen the servo band and stabilize the servo system. In addition, the focusing and tracking processes can be controlled with high accuracy. When the lens moves in the focusing or tracking direction, it doesn't shift in the signal direction, so that the jitter can be prevented. Further, the device is simple in construction, highly usable and low in cost.

DETAILED DESCRIPTION OF THE PREFERRED EMBODIMENT

Figure 1:
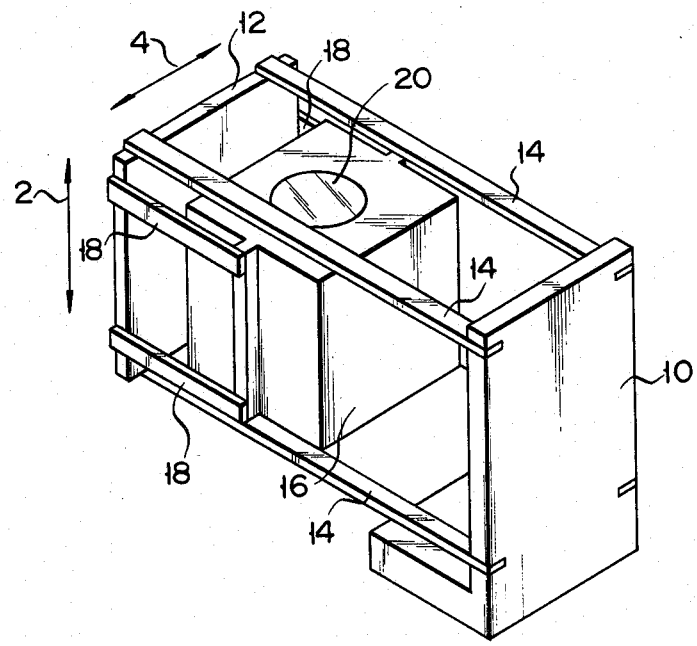
FIG. 1 is a perspective view showing a conventional optical head device.
Figure 2:
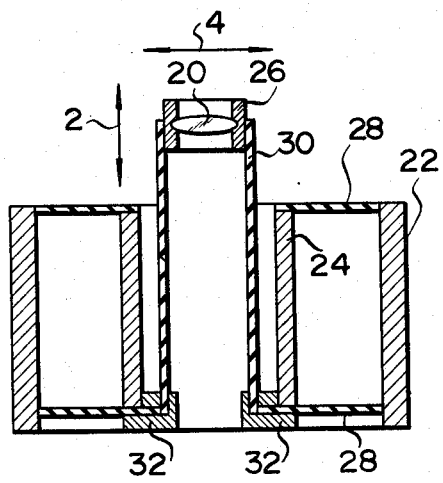
FIG. 2 is a longitudinal section showing another conventional optical head device.
Figure 3:
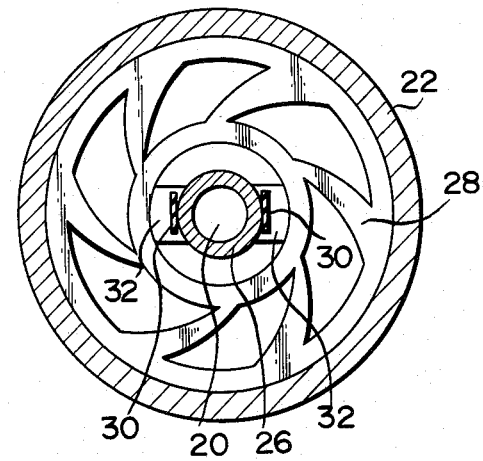
FIG. 3 is a plane view showing the device in FIG. 2.
Figure 4:
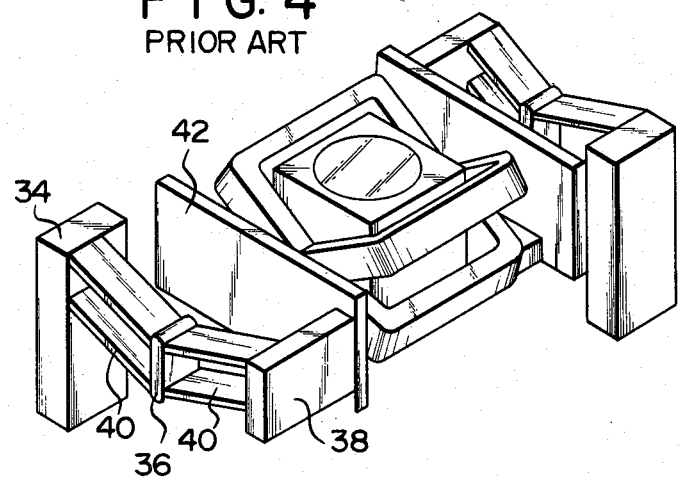
FIG. 4 is a perspective view showing a further conventional optical head device.
Figure 5:
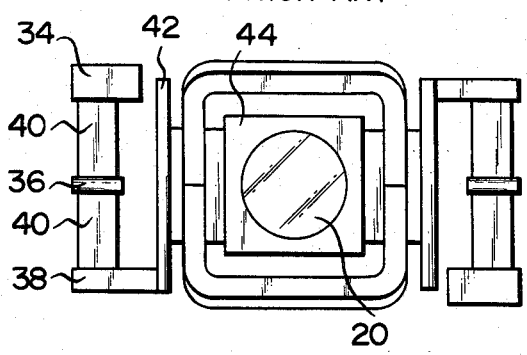
FIG. 5 is a plane view showing the device in FIG. 4.
Figure 6:
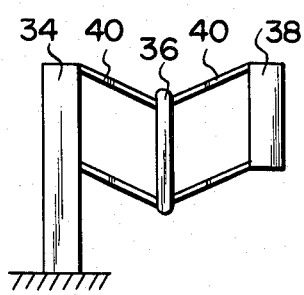
FIGS. 6 through 8 are intended to explain the operation of the device in FIG. 4.
Figure 7:
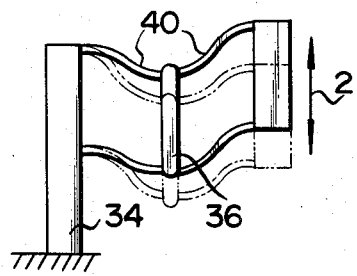
Figure 8:
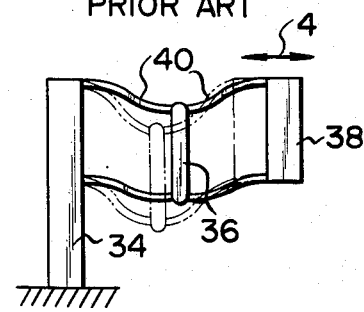
Figure 9:
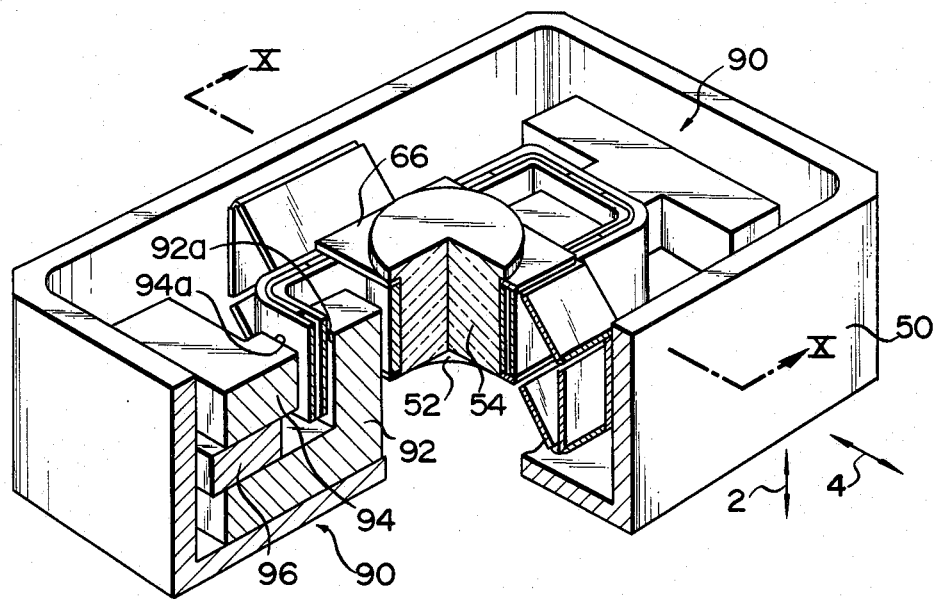
FIG. 9 is a perspective view showing, partly cut away, an example of the optical head device according to the present invention.
Figure 10:
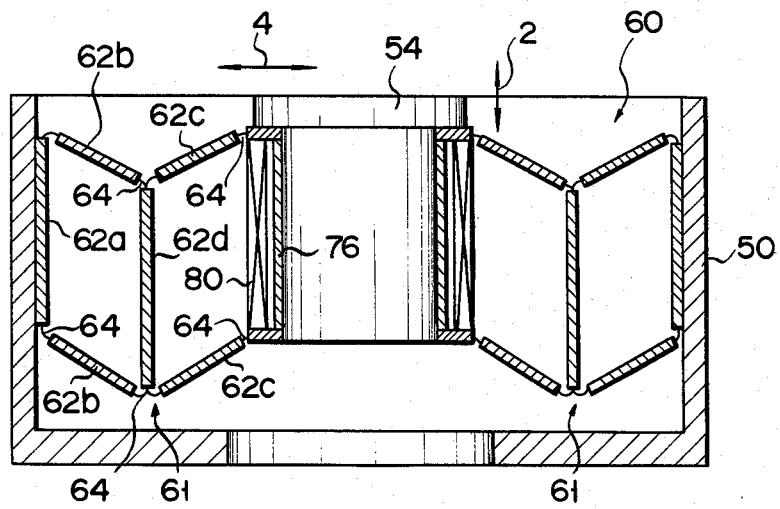
FIG. 10 is a sectional view taken along a line X—X in FIG. 9.

FIGS. 9 and 10 show an example of the optical head device according to the present invention. A box-like casing 50 has a circular window 52 formed in the bottom center of the casing 50. An objective lens 54 is located above the window 52. The lens 54 is supported by a support mechanism fixed to a pair of opposed inner faces of the casing 50. Arranged at another pair of opposed inner faces of the casing 50 is a driving system for the lens 54.

Figure 11:
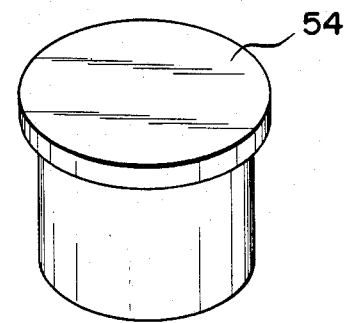
FIG. 11 is a perspective view showing a lens.
Figure 12:
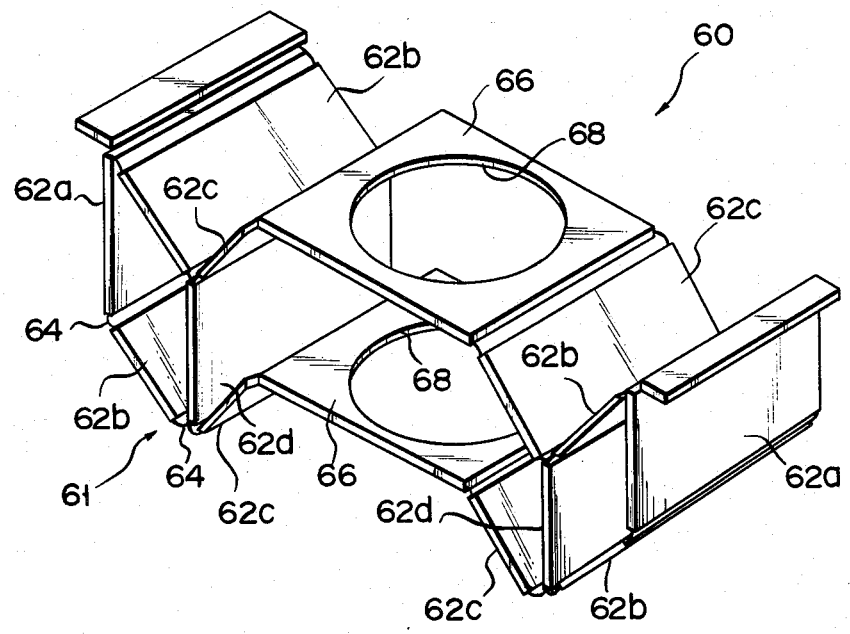
FIG. 12 is a perspective view showing a support mechanism.
Figure 15:
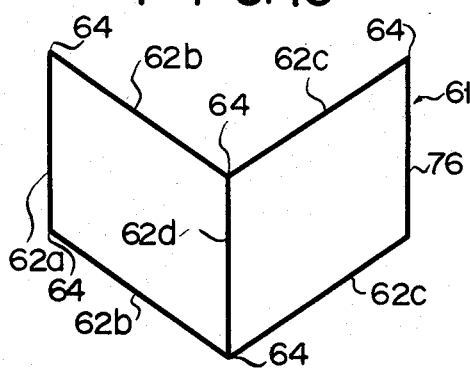
FIGS. 15 through 17 are intended to show the operation of the support mechanism.

As shown in FIG. 11, the lens 54 is made like a column, having a larger-diameter portion on the top thereof. As shown in FIG. 12, the support mechanism 60 has plate-like rigid connector portions 62 (62a, 62b, 62c, 62d), a pair of rigid holder portions 66 for holding the lens 54, and flexible hinge portions 64 for supporting the connector portions 62 or the connector portions 62 and the holder portions 66 swingable around the hinge portion 64. The holder portions 66 are made like plates having through-holes 68 formed in the center thereof, through which the lens 54 is inserted. Each of the connector portions 62a is fixed to the inner faces of the casing 50, respectively. The upper and lower sides of the connector portion 62a are connected to the paired holder portions 66, which are vertically separated from each other, by means of two pieces of the connector portions 62b and 62c, respectively. The hinge portions 64 between the connector portions 62b and 62c are connected to the connector portion 62d. A frame parallelogram structure is obtained by the connector portions 62a, 62b and 62d. Fixed to the paired holder portions 66 is the lens 54 by which the holder portions 66 are separated at the same interval from each other as the length of the connector portion 62d. The connector portions 62a, 62b, 62c and 62d thus form a structure 61 comprising two adjacent parallelograms whose one sides are common to each other. In short, the connector portion 62 is arranged along each of the sides of this structure 61 except those of the structure 61 to which the holder portions 66 are connected. The structures 61 are located on both sides of the holder portions 66, and the lens is moved in focusing and tracking directions 2 and 4 thanks to the deformation of the structures 61. The support mechanism 60 can be formed by bonding a stiff plate onto a face or both faces of a flexible film, which has a certain width, to form the connector portion 62, and by providing an interval of about 0.2 mm between these connector portions to form the hinge portion 64 in the interval. Only the flexible film is present at the hinge portion 64 and resistance against the force of bending the hinge portion 64 is caused at the hinge portion 64 due to the elasticity of this film. In other words, the property of a spring which tends to return to its neutral position acts on the hinge portion 64 due to the elasticity of the flexible film. The support mechanism 60 therefore supports a coil unit 70 at that neutral position shown in FIG. 15.

Figure 13:
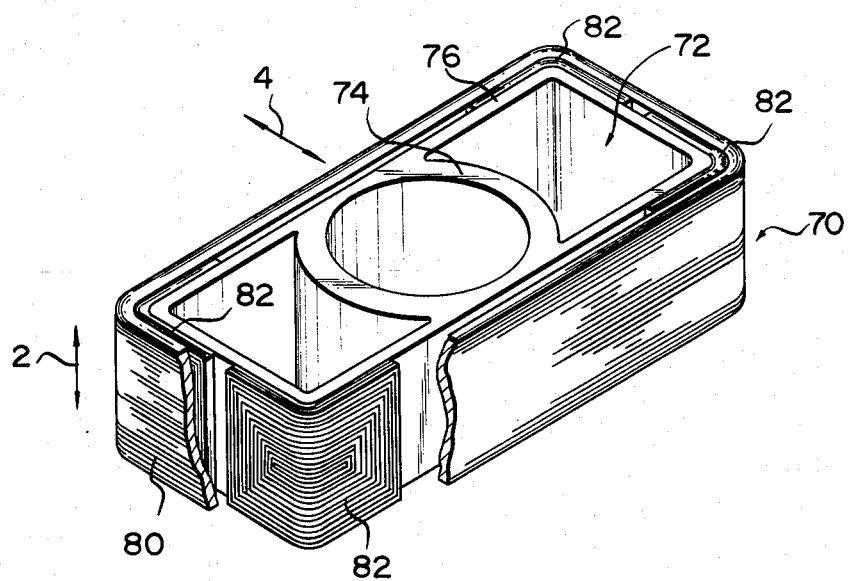
FIG. 13 is a perspective view showing a coil unit.

As shown in FIG. 13, the coil unit 70 has a coil bobbin 72 around which a coil is wound, a focusing coil 80 and a tracking coil 82. The coil bobbin 72 has a frame portion 76 made like a rectangle, and a cylindrical lens holder portion 74 formed in the center of the frame portion 76 and in contact with the long sides thereof, and through which the lens 54 is inserted. The tracking coil 82 is attached to the outer face of the frame portion 76 at each of the four corners thereof. The tracking coil 82 is plainly wound, drawing a rectangular loop. The coil 82 is along the little rounded corner of the frame portion 76 and bent substantially at a right angle along the center line thereof. The focusing coil 80 is wound on the tracking coils 82, enclosing the sides of the frame portion 76.

Figure 14:
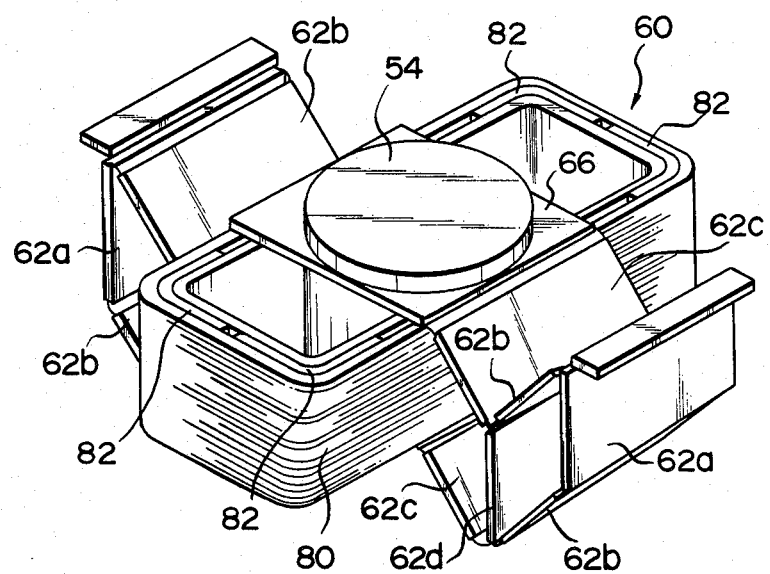
FIG. 14 is a perspective view showing the lens, support mechanism and coil unit assembled.

The lens 54, support mechanism 60 and coil unit 70 constructed as described above are assembled as shown in FIG. 14. The coil unit 70 is inserted between the paired holder portions 66 of the support mechanism 60, aligning the center of the hole 68 with that of the lens holding portion 74 thereof. Keeping this state, the lens 54 is inserted into the hole 68 and the lens holding portion 74. The holder portions 66 are then fixed to the coil unit 70.

A coil driving system 90 has magnetic pole members 92 and 94 made of a material which allows the magnetic force of iron or the like to pass therethrough, and a permanent magnet 96 which magnetize these magnetic pole members. The magnetic pole members 92 and 94 have magnetic poles 92a and 94a which hold the short sides of the coil unit 70 between them and which are separated by a certain distance from the coil unit and parallel to the short sides of the coil unit 70. The coil driving system 90 having such an arrangement as described above is arranged on both short sides of the coil unit 70, respectively.

The operation of the optical head device constructed as described above will be described. The focusing coil 80 of the coil unit 70 extends parallel to the upper and lower edges of the frame portion 76, enclosing the sides of the frame portion 76. In short, the lines of the coil 80 are perpendicular to the focusing direction 2. On the other hand, the magnetic field is applied between the magnetic poles 92a and 94a by means of the magnet 96. This magnetic field crosses the lines of the focusing coil 80, perpendicular to the focusing and tracking directions 2 and 4. When current is applied to the focusing coil 80, therefore, force acts on the focusing coil 80 or coil unit 70 in a direction perpendicular to the current and magnetic field, that is, in the focusing direction 2 according to Fleming's rule. The magnitude and direction of this force are determined by those of the current applied to the focusing coil 80. When it is subject to this force, the support mechanism 60 carries out its deformation from its neutral position shown in FIG. 15 to the position shown in FIG. 16 in which the angle between the adjacent connector portions 62 changes around the hinge portion 64 interposed between them. The coil unit 70 is located at that position where the force is balanced by a moment acting on the structure of the support mechanism 60 which comprises the connector portions 62 and the hinge portions 64.

Figure 17:
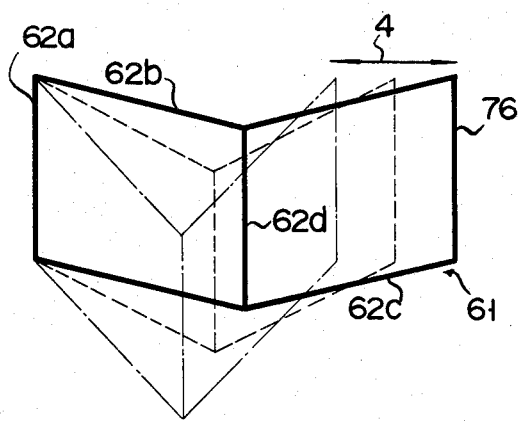

On the other hand, that portion of the tracking coil 82 located at the short side of the coil unit 70 is present in the magnetic field between the magnetic poles 92a and 94a. When current is applied to those portions of the tracking coils 82 in such a way that current flows in the same direction (upward or downward direction) at those portions of the coils which are adjacent to the short sides of the coil unit 70, force acts on those portions of each of the paired coils 82, which are located at the short sides of the coil unit 70 and which extend in the focusing direction 2, in the tracking direction 4 according to Fleming's rule. On the other hand, force also acts on those portions of the coils 82 which are parallel to the upper and lower edges of the frame portion 76 (or parallel to the tracking direction 4). However, current flows in both directions of the tracking line 4 at these portions. Therefore, force acts on these portions in both directions of the focusing line 2 (or upward and downward directions in FIG. 13) to offset each other. No force thus acts on the tracking coils 82 in the focusing direction 2. When current is applied to the tracking coils 82, therefore, the tracking coils 82 or coil unit 70 are subject to a force in the tracking direction 4, and the direction and magnitude of this force are determined by the current flowing to the coils 82. The structure 61 is deformed by this force, as shown in FIG. 17. One of the structures 61 deforms to extend while the other deforms to retreat. The coil unit 70 is stopped at that position where this force is balanced by the movement of the support mechanism.

Figure 16:
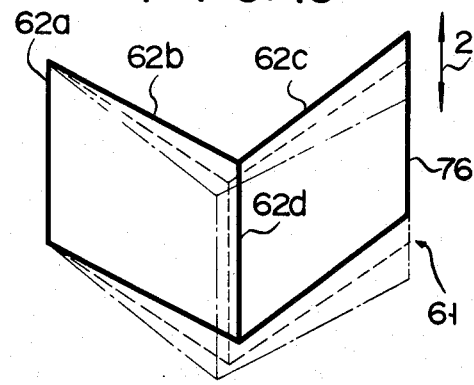

As shown in FIGS. 16 and 17, the frame portion 76 moves, in this case, parallel to the connector portion 62a fixed to the side of the casing 50. Therefore, the coil unit 70 and the lens 54 move keeping the optical axis of the lens in accordance with the focusing direction 2. The focusing and tracking of the coil unit 70 or lens 54 can be controlled by adjusting the magnitude and direction of current flowing to the focusing and tracking coils 80 and 82, as described above.

With the device having the above-described arrangement, the lens is supported not by the plate springs but by the support mechanism which has stiff portions and hinge portions. The whole of the support mechanism can be thus made as small as the lens, thereby enabling the optical head device to be small in size. Since the support mechanism is a unit, the mass of its movable parts can be lightened, thereby making it easy to design the device as a small one.

When stiff material is used as the connector portions 62, as in the case of this example, high-rank mode resonance is difficultly caused, and the servo band can be widened. The lens 54 and coil unit 70 are supported by the support mechanisms 60 which are symmetrical in relation to a plane passing through the center of lens 54, so that the lens and the like can be moved taking the center of gravity of the lens 54 and coil unit 70 as their center to be supported. Therefore, the whole balance of the device can be enhanced, and a structure in which the high-rank mode resonance is difficultly caused can be provided.

Figure 18:
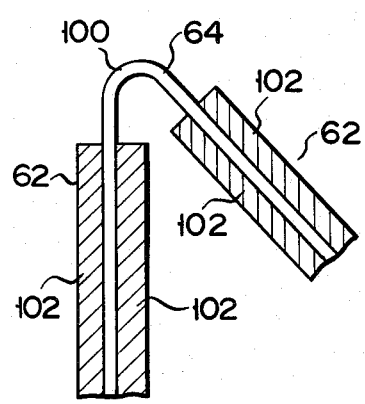
FIGS. 18 through 20 are sectional views showing variations of the support mechanism.
Figure 19:
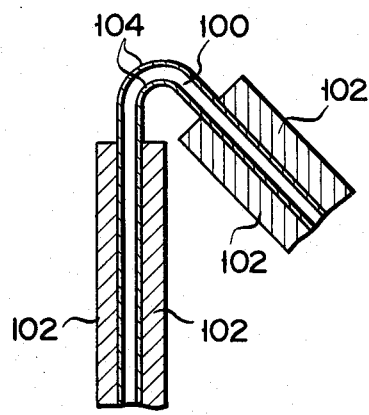
Figure 20:
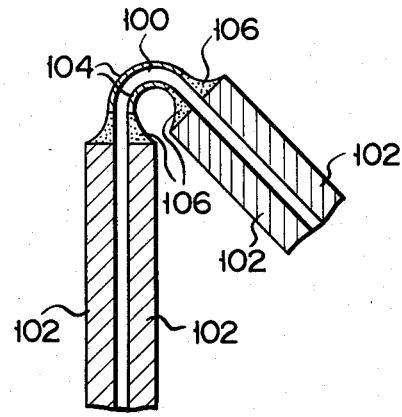

The support mechanism 60 will be described in detail. As shown in FIG. 18, stiff plates 102 are bonded to both faces of a flexible film 100 which has a predetermined width, and those portions of the film to which the stiff plates 102 are bonded represent connector portions 62 which do not deform. An interval of about 0.2 mm is provided between the adjacent connector portions 62 and the film is exposed at this interval area, serving as a hinge portion 64 which deforms elastically due to the elasticity of the film. The support mechanism 60 can be thus made simple in construction, thereby enabling the support mechanisms to be easily made. The stiff plate may be bonded to one face of the film 100. A variation of the support mechanism 60 is shown in FIG. 19. A layer made of viscous and elastic material such as silicone rubber, butyl rubber, and epoxy resin is coated on both faces of the film 100. These viscous and elastic layers 104 increase the attenuation effect when the hinge portion 64 deforms. This attenuation effect makes the survo system more stable. Another variation of the support mechanism is shown in FIG. 20. The viscous and elastic layers 104 are present only at the hinge portion 64. In short, the stiff plate 102 is bonded directly to both faces of the film 100. The viscous and elastic material 106 is made as thick as the stiff plate 102 at the boundary between the connector portion 62 and the hinge portion 64, thereby preventing the stiff plate 102 from peeling off from the film 100. In a case where a thin film of copper is used as the stiff plate 102 and formed on both faces of the film 100, the viscous and elastic material 106 can prevent the thin film of copper from oxidizing from that end of the copper film with which the viscous and elastic material 106 is contacted. When a material having the attenuation effect relative to vibration is used instead of the viscous and elastic material, the elastic characteristic of the film 100 involves the attenuation characteristic of this material to thereby provide a stable support mechanism. Further, when the film is coated with these materials, the concentration of stress on the hinge portions 64 can be avoided and the film 100 can be prevented from becoming fatigued.

Figure 21:
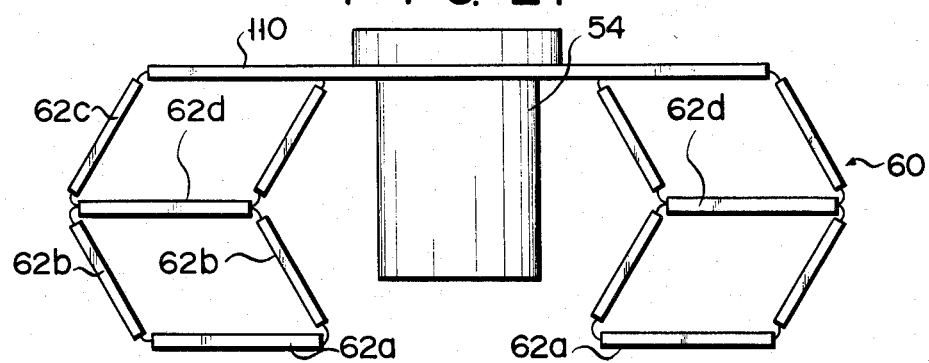
FIG. 21 shows another example of the optical head device according to the present invention.

FIG. 21 shows a further variation of the support mechanism 60. The connector portion 62a of this support mechanism 60 is fixed to the bottom of the casing 50. Four-joint link structures are put one upon the other and a holder portion 110 for holding the lens 54 is supported on the upper end of these link structures.

Figure 22:
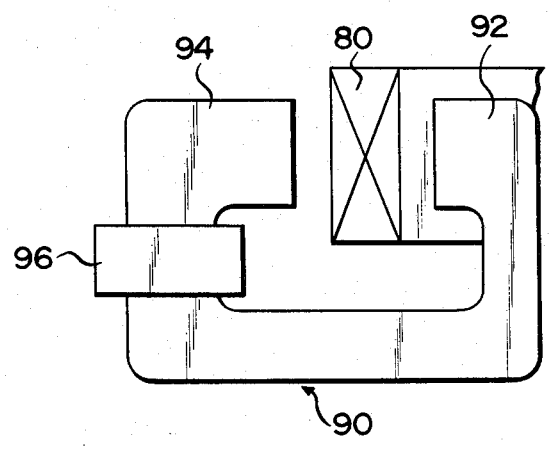
FIGS. 22 and 23 show variations of the driving system.
Figure 23:
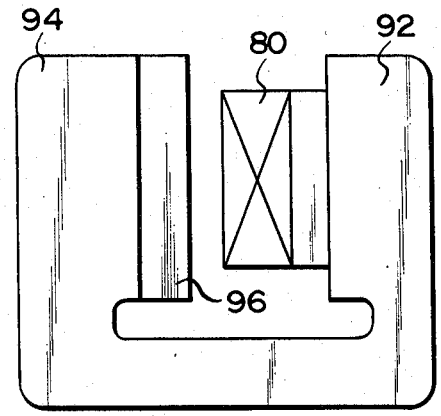

The driving system 90 in the optical head device shown in FIG. 9 is of the long voice coil structure, as typically shown in FIG. 22. However, it may be of the short voice coil structure, as shown in FIG. 23. If so, the lens can be stably driven when it is to be moved or shifted, because the position at which force acts on the coil 60 is not changed.

What is claimed is:

1. An optical head device for moving a lens in focusing and tracking directions comprising:
   a casing;
   a support mechanism for supporting the lens movable in the focusing direction and also in the tracking direction perpendicular to the focusing direction; and
   a driving means for moving the lens, which is supported by the support mechanism, in the focusing and tracking directions;
   said support mechanism having connector portions for forming a pair of structures comprising two adjacent parallelograms whose one sides are common to each other, holder portions arranged between the structures to hold the lens, and hinge portions for connecting the two connector portions or connector and holder portions swingable around the hinge portion, wherein the structures deform, holding their parallelograms, to move the lens in the focusing and tracking directions.

2. An optical head device according to claim 1, wherein the connector portions have stiffness.

3. An optical head device according to claim 2, wherein at least one of the hinge portions has elasticity and the elasticity of this hinge portion urges the structures to return to their initial form.

4. An optical head device according to claim 3, wherein the driving means has a coil unit held by holder portions, said coil unit including focusing and tracking coils, and a magnetic field generating means for applying magnetic field to these coils, and when current is applied to the focusing and tracking coils, force acts on the coil unit in the focusing and tracking directions.

5. An optical head device according to claim 4, wherein the coil unit has a rectangular frame portion, the magnetic field generating means generates magnetic field in a direction perpendicular to the focusing direction and to the tracking direction, and the focusing coil is wound perpendicular to the focusing direction and enclosing the frame portion, and four tracking coils each drawing a rectangular loop are located at four corners of the frame portion in such a way that that part of each of the coils which is in the magnetic field generated from the magnetic field generating means extends in the focusing direction.

6. An optical head device according to claim 2, wherein the support mechanism has the connector portions which comprise bonding stiff plates on a flexible film with a predetermined interval interposed between the stiff plates, and it also has the hinge portions each comprising the film between the connector portions.

7. An optical head device according to claim 6, wherein the support mechanism has layers each made of a viscous and elastic material and formed on the flexible film.

8. An optical head device according to claim 7, wherein the viscous and elastic material layer is formed on those portions of the film where no stiff plate is present, and it is as thick as the stiff plate at those edges of the stiff plate with which it is contacted.

9. An optical head device according to claim 8, wherein the stiff plate is a thin film of copper.

10. An optical head device according to claim 9, wherein the support mechanism has layers formed on the faces of the film, each of said layers being made of a material which has an attenuation effect relative to vibration.

* * * * *